(12) United States Patent
Dougherty et al.

(10) Patent No.: US 6,255,014 B1
(45) Date of Patent: Jul. 3, 2001

(54) CENTER POINT VENT COVER FOR BATTERY

(75) Inventors: Thomas J. Dougherty, Waukesha; Michael G. Andrew, Menomonee Falls; James A. Lenz, Oconomowoc, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/232,542

(22) Filed: Jan. 18, 1999

Related U.S. Application Data

(60) Provisional application No. 60/071,789, filed on Jan. 19, 1998.

(51) Int. Cl.⁷ .................................................. H01M 2/12
(52) U.S. Cl. ............................. 429/82; 429/87; 429/161
(58) Field of Search .......................... 429/53–55, 57, 429/72, 82–84, 87–89, 94, 149, 151, 160, 161, 163, 164, 175, 176

(56) References Cited

U.S. PATENT DOCUMENTS

| | | | |
|---|---|---|---|
| 3,110,634 | 11/1963 | Bradshaw | 136/173 |
| 3,494,800 | 2/1970 | Shoeld | 136/176 |
| 4,346,151 | 8/1982 | Uba et al. | 429/54 |
| 4,383,011 | * 5/1983 | McClelland et al. | |
| 5,045,086 | 9/1991 | Juergens | 29/623.1 |
| 5,047,300 | 9/1991 | Juergens | 429/94 |
| 5,198,313 | 3/1993 | Juergens | 429/94 |
| 5,356,733 | 10/1994 | Green et al. | 429/72 |
| 5,368,961 | 11/1994 | Juergens | 429/233 |
| 5,464,701 | 11/1995 | Rey | 429/53 |
| 5,686,202 | 11/1997 | Hooke et al. | 429/160 |
| 6,051,336 | * 4/2000 | Dougherty et al. | |

FOREIGN PATENT DOCUMENTS

| | | |
|---|---|---|
| 0115878 | 8/1984 | (EP) . |
| 0140581 | 5/1985 | (EP) . |
| 0169179 | 1/1986 | (EP) . |
| 1378655 | 12/1974 | (GB) . |
| 60-131754 | 7/1985 | (JP) . |
| 62-249352 | 10/1987 | (JP) . |

* cited by examiner

*Primary Examiner*—Carol Chaney
*Assistant Examiner*—Susy Tsang
(74) *Attorney, Agent, or Firm*—Quarles & Brady LLP

(57) ABSTRACT

The apparatus of the present invention provides a cover for venting gases from thin metal film battery cells having vents disposed at the center of one end of the cells. The vents comprise cylindrical wells that recess into, and substantially fill, the top portions of battery cell cavities within a battery housing. The cavities are sized to hold the battery cells securely and are configured to provide an electrical serial connection. The wells include pipes which extend outward from the bottom of the wells and lead from openings in the bases of the wells. The openings in the pipes are covered with flexible valve caps and well lids cover the wells. The center point arrangement of the recessed wells permit gases from the battery cells to escape through the openings, yet restrict the electrolyte from exiting the housing. The base of the battery housing does not have vent openings and is interchangeable with the cover so that the battery housing may be oriented with the terminals near the top or the bottom of the case.

14 Claims, 4 Drawing Sheets

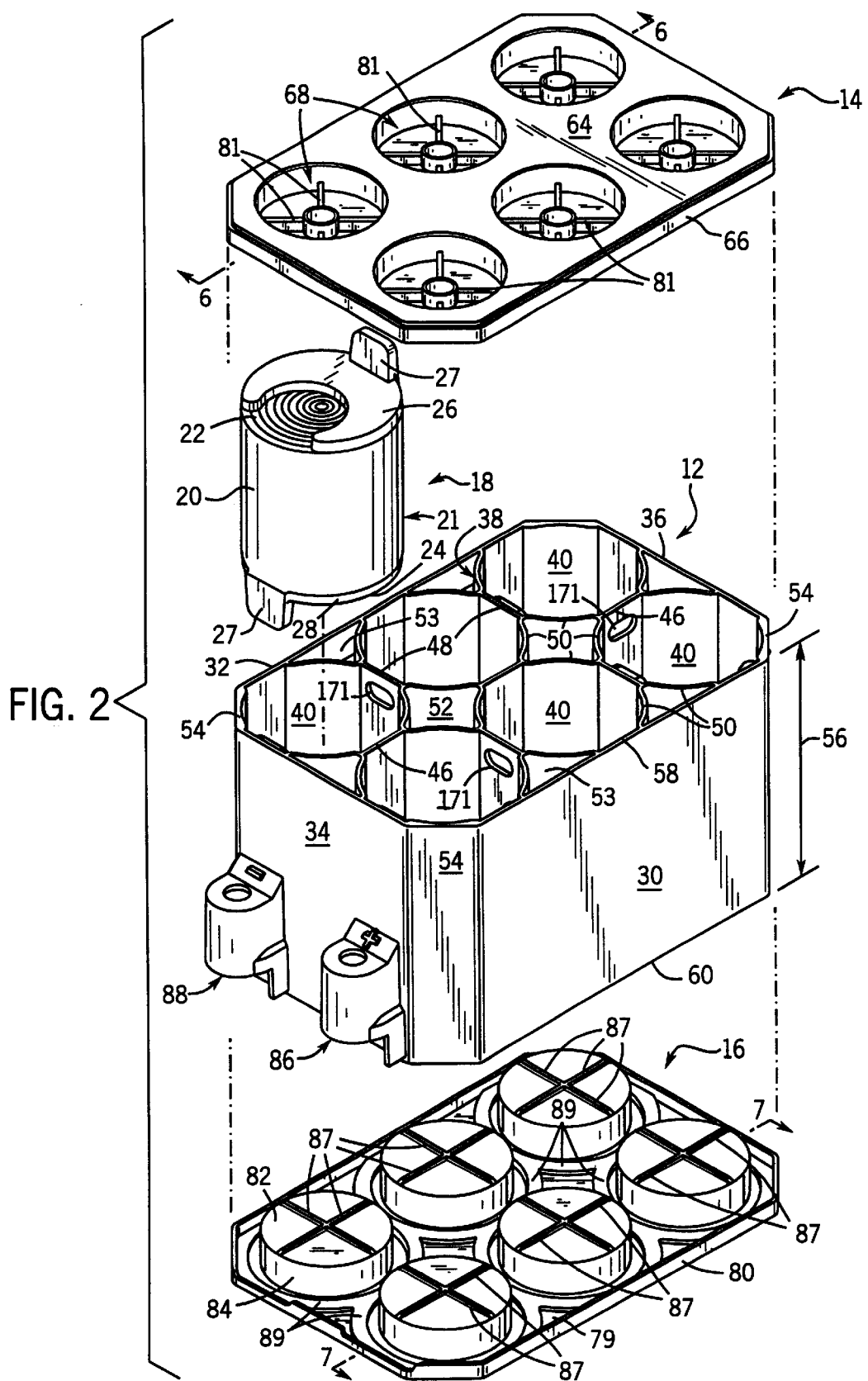

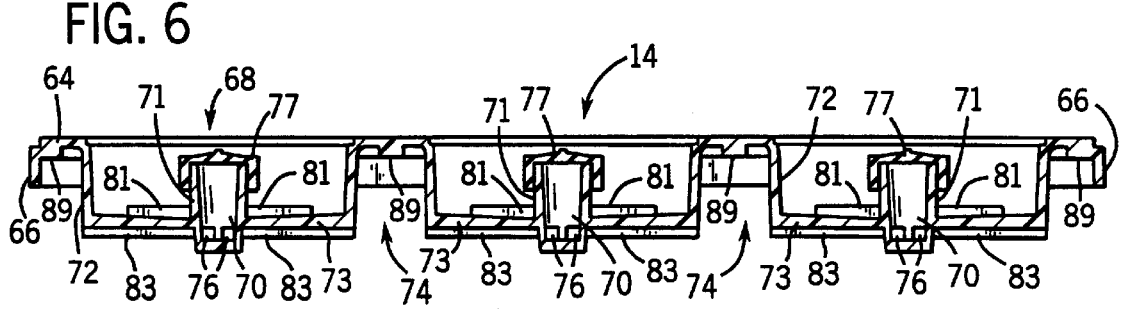
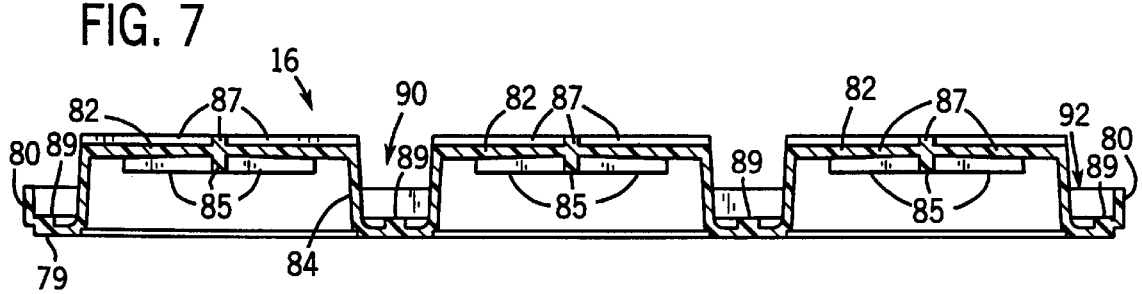
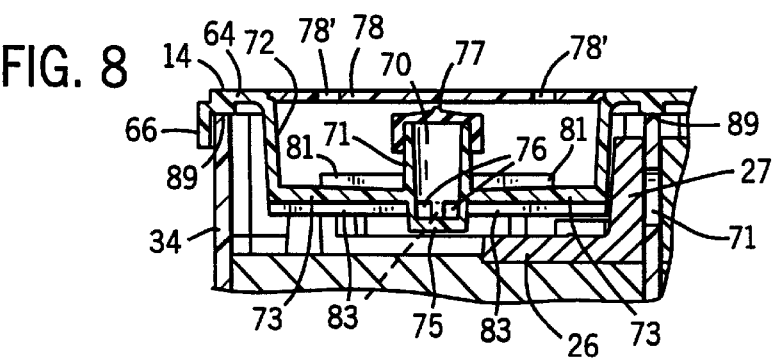

CENTER POINT VENT COVER FOR BATTERY

This application claims the benefit of U.S. provisional application No. 60/071,789, filed on Jan. 19, 1998.

BACKGROUND OF THE INVENTION

The present invention relates to electric storage batteries, and more particularly to an arrangement for venting gases from thin metal film battery cells.

Thin metal film (TMF) battery technology provides a compact high power battery cell. Cells of this type are well known and their construction and manufacture have been described in, for example, U. S. Pat. Nos. 3,494,800; 5,045,086; 5,047,300; 5,198,313 and 5,368,961 the disclosures of which are hereby incorporated by reference. A thin metal film battery cell includes thin metal film plates sealed within a valve-regulated, sealed cell container. The cells include absorptive glass-mat (AGM) separator technology in an electrolyte starved system. The thin metal film plates are made from very thin lead film pasted on both surfaces with an active material. Plates having positive active material and plates having negative active material are spiral wound with separator material, and terminations are cast-on or soldered to the ends of the spiral roll. The roll is encapsulated in a container which is filled with electrolyte and then sealed.

When thin metal film batteries are charged, the excitation of the positive and negative active materials tends to heat the electrolytic fluid which causes some of the electrolytic fluid to change from a liquid to a gas. This gas accumulates and increases the pressure within the battery case. In extreme overcharging conditions, the accumulated gas can rupture the battery enclosure. Prior art inventions place openings in the battery enclosure to release the gas and prevent built-up pressure within the enclosure; however, the electrolyte may also exit through such openings. Thus, the present invention is directed to the venting of gases accumulated in a thin metal film battery housing while preventing electrolyte from exiting the housing.

SUMMARY OF THE INVENTION

In accordance with the invention, the apparatus includes a battery housing containing at least one cavity for holding a battery cell. The housing is enclosed by a cover having a vent opening at the base of a venting well that is substantially centered and recessed within one end of the cavity so as to substantially fill the top of the cavity. The venting well also includes a pipe, or well aperture, at its center extending outwardly from the vent opening. A baffle is disposed at an inner end of the well aperture that partially interrupts direct flow through the vent opening.

Preferably, a flexible valve cap is mounted on the top of, and seals to, the well aperture. The valve cap is preferably made of a flexible rubber material that expands at a venting pressure to allow gases from within the cavities to escape and contracts when below the venting pressure to reseal to the well aperture. A well lid or cover closes the top of the well.

Such a vent arrangement is provided above each cell in a multiple cell battery. The vent may be formed in a top that closes the body into which the cells are mounted. Preferably, the top is interchangeable with a bottom that does not include the vents.

The foregoing and other objects and advantages of the invention will be found in the detailed description that follows. In the description, reference is made to the accompanying drawings which illustrate a preferred embodiment of the invention.

BRIEF DESCRIPTION OF THE DRAWINGS

FIG. 2 is an exploded perspective view of the battery illustrated in FIG. 1, showing one thin metal film battery cell and with no lids or caps;

FIG. 6 is a cross-sectional view of the top of the battery case taken along the line 6—6 illustrated in FIG. 2;

FIG. 7 is a cross-sectional view of the bottom of the battery case taken along the line 7—7 shown in FIG. 2; and FIG. 8 is an enlarged view in cross section of one vent in the top of the battery case.

DETAILED DESCRIPTION OF THE PREFERRED EMBODIMENTS

Figure 1:
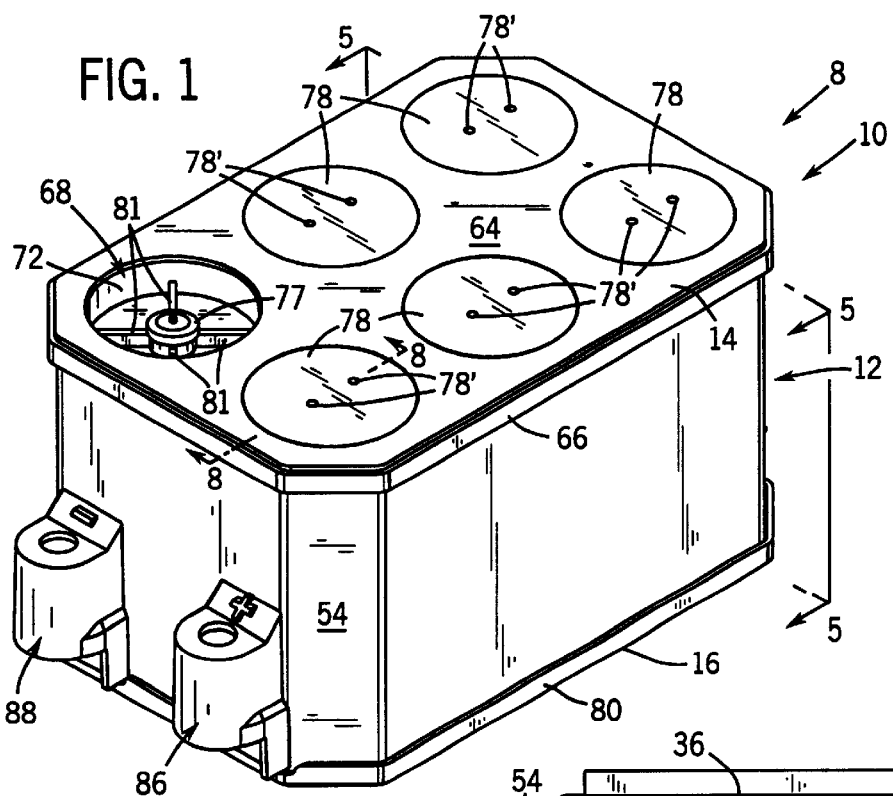
FIG. 1 is a perspective view of the battery with a center point vent cover according to the present invention with one lid removed.

As illustrated in FIG. 1 the battery 8 includes a case 10 having a body or housing 12 with a top 14 and a bottom 16 each coupled to the body in a manner known in the art such as by heat sealing. The case 10 is configured to accommodate a plurality of thin metal film cells 18 (FIG. 2) that include a thin metal film 20 coiled in a spiral in a manner generally known in the art (for illustration purposes, the spiral coil is shown in the figures as multiple concentric circles). The film 20 defines an outer cylindrical surface area generally indicated by reference numeral 21, a first end 22, and second end 24. First 26 and second 28 conducting leads are coupled to the respective first 22 and second 24 ends of the coiled thin metal film 20 such as by welding or an equivalent technique known in the art. As thin metal film battery cells are generally known in the art, recognized techniques for manufacturing such cells and the manner in which they generate electricity will not be described herein. For a general description of such cells, reference may be had to U.S. patent application Ser. No. 08/870,803, filed Jun. 6, 1997, entitled "Modular Electric Storage Battery", and assigned to the assignee of the present invention, the disclosure of which is incorporated herein by reference.

Figure 3:
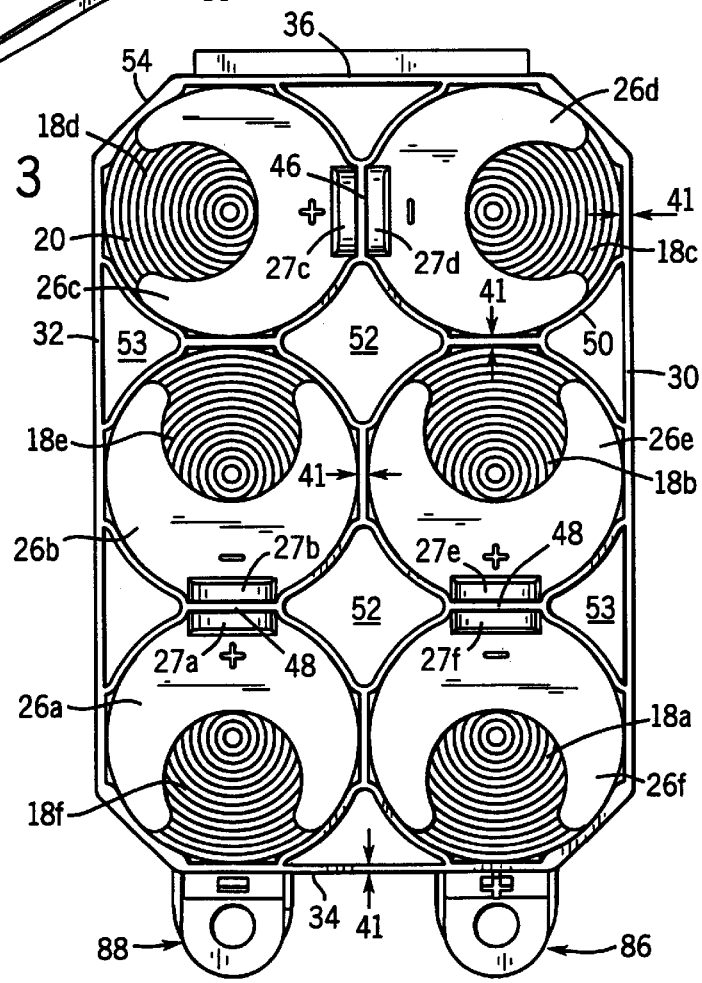
FIG. 3 is a top plan view of the battery case illustrated in FIG. 1 with the top and bottom of the case removed for clarity, showing one thin metal film battery cell in each cavity.

With reference to FIGS. 2 and 3, body 12 includes exterior side walls 30 and 32 and exterior end walls 34 and 36 as well as a plurality of partition walls generally indicated by reference numeral 38. Partition walls 38 interconnect exterior side walls 30 and 32 and exterior end walls 34 and 36 in a modified honeycomb configuration that includes a plurality of generally octagonal shaped cell cavities 40.

In the illustrated embodiment, exterior walls 30, 32, 34, and 36, as well as each of the plurality of partition walls 38, have the same wall thickness 41 (FIG. 3) thereby simplifying the manufacture of case 10. Partition walls 38 include a plurality of first planar segments 46 and second planar segments 48 oriented orthogonal to first planar segments 46. Second planar segments 48 are further orthogonal to first 30 and second 32 exterior side walls and parallel to first 34 and second 36 exterior end walls. In a similar manner, each of first planar segments 46 are orthogonal to first 34 and second 36 exterior end walls and parallel to first 30 and second 32 exterior side walls. A plurality of arcuate connector segments 50 interconnect first 46 and second 48 planar segments as well as couple the planar segments 46 and 48 to the respective exterior side 30 and 32 and end 34 and 36 walls. Each of the arcuate connector segments 50 are integral with one or three other arcuate connector segments 50 to define a plurality of roughly diamond shaped passages 52 or half diamond shaped passages 53, each with rounded corners as shown.

Figure 5:
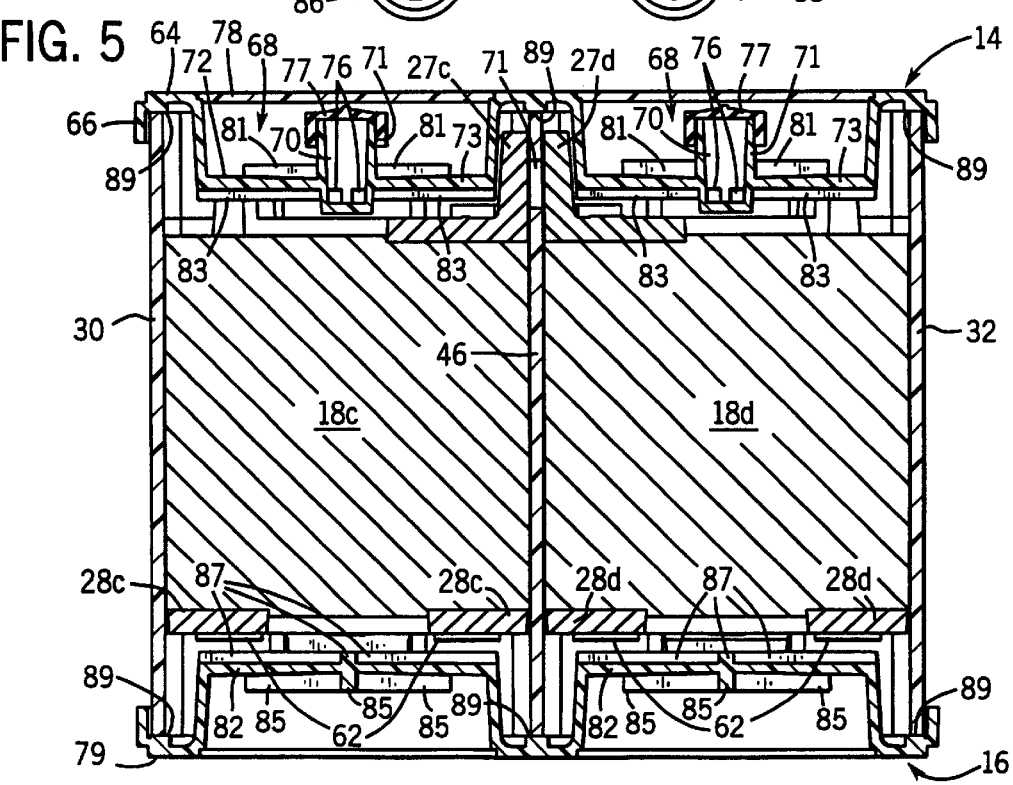
FIG. 5 is a cross-sectional view of the battery taken along the plane 5—5—5 shown in FIG. 1.

The planar segments 46 and 48, the exterior side and end walls, and the arcuate connector segments 50 cooperate to define the octagonal cell cavities 40 for accommodating cells 18. As best illustrated in FIG. 3, cells 18a–18f are each disposed in a cavity 40 (FIG. 2) of body 12. The arcuate configuration of segments 50 is predetermined to securely retain the cells 18 within each cavity 40. More particularly, in the preferred embodiment, the overall size of each cavity 40 as well as the shape of arcuate segments 50 are predetermined so that during the insertion of each cell 18 within each cavity 40, the arcuate segments 50 matingly engage the cell 18 along in excess of fifty percent (50%) of the exterior surface area 21 of film 20. The uniform thickness of the exterior case walls 30, 32, 34, and 36 and each partition wall 38 uniformly compresses the cell during insertion such as by compressing the glass fiber separators normally included therewithin. Accordingly, the cells 18 are securely nested and retained within the cavities 40. Finally, as illustrated in FIG. 5, top 14 and stops 62, described in detail below, longitudinally retain the cells 18 within the cavities 40 as shown.

As illustrated, the exterior side walls 30 and 32, exterior end walls 34 and 36, and partition walls 38 of body 12 are integral with one another. It is preferred that the walls 30, 32, 34, 36 and 38 are formed of a thermally resistant plastic material such as polypropylene through processes known in the art such as stamping, casting, or injection molding.

In order to further define generally octagonal cell cavities 40, exterior side walls 30 and 32 are connected to exterior end walls 34 and 36 via truncated planar corner segments 54. As best illustrated in FIG. 2, the exterior walls 30, 32, 34, and 36 of body 12 are of a uniform length 56 defining an upper end 58 and a lower end 60. Top 14 is coupled to the case 12 proximate to upper end 58 and bottom 16 is coupled proximate to lower end 60 thereof (FIG. 1).

Figure 4:
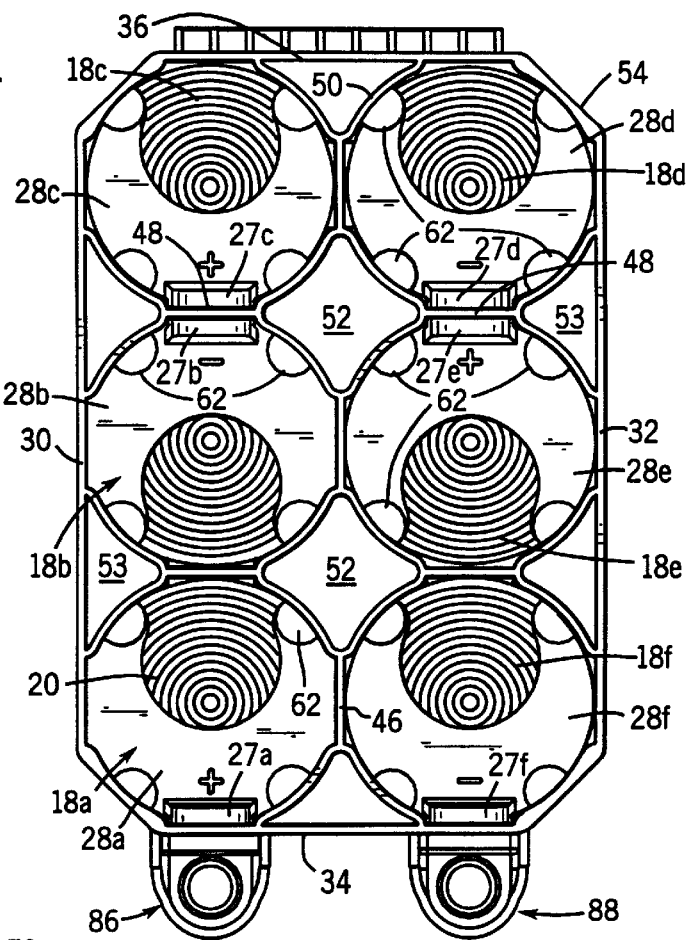
FIG. 4 is a bottom plan view of the battery shown in FIG. 1 with the top and bottom of the case removed for clarity, showing one thin metal film battery cell in each cavity.

In addition to the robustness, retention features, and moldability of the modified honeycomb configuration of the present invention, the flat surfaces provided by planar segments 46 and 48 facilitate the proper alignment of each cell 18 within its respective cavity 40 and provides a flat surface for complete electrical interconnection of the cells 18 by welding as hereinafter described. More particularly, as best illustrated in FIGS. 3 and 4, the upstanding tabs 27a–27f of the cells 18a–18f are disposed within the cavities 40 adjacent one of the planar surfaces 46 and 48. The welded interconnection between adjacent tabs 27 within the battery case 10 occurs through an orifice 171 formed in the planar segments 46 and 48 as hereinafter described and as illustrated in FIG. 5. Those skilled in the art will appreciate that a complete weld connection between adjacent tabs 27 is facilitated by the planar configuration of surfaces 46 and 48.

As shown in FIGS. 4 and 5, body 12 further includes a plurality of semicircular stops 62 integral with and extending inwardly from arcuate connector segments 50 and truncated planar corner segments 54. Stops 62 are recessed from lower end 60 (FIG. 5) of these respective segments to properly position the cells 18 within the cell cavities 40 thereby facilitating the electrical interconnection of the cells 18 as hereinafter described.

The configuration of the top 14 will now be described with reference to FIGS. 1, 5, 6, and 8. The top 14 is preferably formed of the same plastic material as body 12 through stamping, casting, injection molding, or other method known in the art. The top 14 includes an upper planar member 64, a connecting flange 66 extending downwardly from the periphery of upper member 64, and a plurality of vents 68 (FIG. 6) disposable within the cell cavities 40 when the top 14 is connected to body 12 (FIG. 5). Vents 68 allow dissipation of gases generated within case 10 during the charging and discharging cycles of the cells. The vents 68 include venting passages 70 defined by upstanding cylindrical pipes 71 that selectively provide access to the cell cavities 40 for placement of an electrolyte within each of the cell cavities 40.

The vents 68 are partially defined by a cylindrical well 72 interconnecting upper planar member 64 and a well bottom 73. The cylindrical wells 72 of adjacent vents 68 are separated from one another so as to define a recessed cavity 74 that accommodates the upstanding tab 27 on conducting leads 26 or 28 for electrically interconnecting the cells 18 as hereinafter described. Upper 81 and lower 83 sets of ribs are integral with and protrude from the top and bottom surface respectively of each well bottom 73. The ribs of each set 81 and 83 are aligned perpendicularly and extend from the edges of the wells 72 to provide structural support for the vents 68. On separate, parallel planes, the upper ribs 81 bisect the angles formed by the lower ribs 83. The ribs 81 and 83 are interrupted near their midpoints by the open venting passage 70 of each vent 68. The ribs 81 and 83 and the recessed wells 72 increase the pressure handling capabilities of the case 10.

The bottom of each venting passage 70 is defined by a baffle 75. When adding electrolytic fluid to the battery 8, the baffle 75 disperses the fluid laterally through the venting passage 70 preventing the stream of fluid from damaging the battery cells 18. A vent opening 76 extends from the well bottom 73 to above and laterally around the baffle 75. A rubber cap 77 is disposed on the top of the pipe 71 above the vent opening 76. The rubber cap 77, made of a polypropylene/polyethylene material such as EPDM, acts as a valve to maintain an air tight seal up to approximately 15 psi. The EPDM material allows the rubber cap 77 to expand and vent the gases at approximately 20 psi, and then reseal. Each well 72 is enclosed by a lid member 78 sealed to the open top of each cylindrical well 72. The lids 78 have at least one laterally offset opening 78' for the escape of gas from the vent. To reduce the likelihood of a rupture in extreme overcharge conditions, the lids 78 are designed to release at approximately 50–60 psi to rapidly vent the gases. The baffle 75, caps 77 and lids 78 collectively work to prevent electrolytic fluid from exiting the battery 8 when vented or inverted.

As illustrated in FIG. 7, the bottom 16 is configured in a manner substantially similar to the top 14 and includes a lower planar member 79, a connecting flange 80, and upper members 82 recessed from the lower planar member 79 and connected thereto via tapered cylindrical connecting walls 84. Protruding some thickness from the bottom and top surface respectively of the each upper member 82 are upper 85 and lower 87 sets of ribs, each set perpendicularly intersecting at the center of the upper members 82, similar to ribs 81 and 83. The bottom 16 does not include the vent arrangement formed in the top 14.

The top 14 and the bottom 16 are connected to body 12 such as by heat sealing or other method known in the art. More particularly, connecting flanges 66 and 80 of top 14 and bottom 16, respectively, are configured to operatively engage exterior side 30 and 32 and end 34 and 36 walls, whereupon the top 14 and the bottom 16 are heat sealed to the body 12 at raised surfaces 89 circumscribing the vents 68 to provide a sealed case that is vented through vents 68 in the top 14.

The electrical interconnection of the cells 18 within the case 10 will now be described with reference to FIGS. 3 and 4. As illustrated, adjacent TMF cells are oppositely oriented in a manner generally known in the art for serial connection. Thus, cell 18a is electrically connected to exterior terminal 86 by second conducting lead 28a (FIG. 4) and is electrically connected to cell 18b via the connection of the respective first conducting leads 26a and 26b. The serial electrical connection of the remaining cells 18b–18f is accomplished in a substantially similar manner and is illustrated in the drawings.

As illustrated in FIG. 5, planar segment 46 separating cells 18c and 18d is provided with an orifice 171 for electrically connecting upstanding tabs 27c and 27d in a manner generally known in the art such as welding. Those skilled in the art will appreciate that the electrical interconnection of each of the plurality of cells 18a–18f occurring through second planar segments 48 are made in a manner substantially the same as that illustrated in FIG. 5 for connection to first planar segment 46. As shown in FIG. 3, the serial electrical connection of cells 18a–18f is completed by electrically connecting the second lead of cell 18f in a manner generally known in the art to terminal 88 which is coupled to the exterior of battery case 12 and, more particularly, to end wall 34.

As indicated above, the position of each cell 18a–18f within its respective cavity 40 is dictated by the positioning of stops 62 as best illustrated in FIGS. 3 and 5. More particularly, each of the cells 18a–18f is disposed within a respective cavity 40 until one of the first 26 and second 28 leads connected thereto engage the stops 62 projecting inwardly into the cavity 40. The stops 62 facilitate the proper positioning of the TMF cells 18 relative to one another to allow precise electrical interconnection, as described above, with relative ease and simplicity.

As seen from the above description and the accompanying drawings, each vent 68 is centered over one of the cells 18 and is recessed down toward the level of the top of a cell 18. The result is that there is very little free space in which gas can accumulate without venting. The vent 68 accommodates the venting of gas but restricts the exit of electrolyte. Because the top 14 and bottom 16 contain identical structures for attachment to the body 12, the terminals 86 and 88 can be located at the top by simply reversing the top 14 and bottom 16 before heat sealing to the body 12.

Illustrative embodiments of the invention have been described in considerable detail for the purpose of disclosing practical, operative structures whereby the invention may be practiced advantageously. The designs described are intended to be illustrative only. The novel characteristics of the invention may be incorporated in other structural forms without departing from the scope of the invention as defined in the following claims.

We claim:

1. A battery comprising a battery housing containing a cell cavity for holding a battery cell, an apparatus for venting gases from the battery, the apparatus comprising:
a battery housing cover having an upper planar member and a vent wherein the vent is partially defined by a well interconnecting the upper planar member and a well bottom, the well bottom including at least one upper rib protruding from a top surface of the well bottom and at least one lower rib protruding from a lower surface of the well bottom, the vent further including a pipe extending through the well bottom, the pipe defining a venting passage, a bottom portion of the pipe including a vent opening and a baffle positioned to partially interrupt fluid flow through the vent opening, the vent being dimensioned such that when the battery housing cover is sealed to the battery housing the well bottom of the vent is positioned below an uppermost edge of an upper end of the cell cavity.

2. The battery of claim 1 further comprising:
a valve cap disposed over the top of the pipe, the valve cap being made of a flexible material and being sized to hermetically seal the venting passage of the pipe up to a venting pressure to allow gases from within the cavity to vent and contracting when below the venting pressure to reseal the venting passage of the pipe.

3. The battery of claim 1 further comprising:
a well lid secured to the top of the well, the well lid including at least one opening for the escape of gases.

4. The battery of claim 1 wherein:
the well is dimensioned such that when the battery housing cover is sealed to the battery housing, the bottom is positioned adjacent the top of the battery cell in order to minimize free space in which gas can accumulate without venting.

5. The battery claim 4 wherein:
the well of the vent is substantially centered within the upper end of the cavity.

6. The a battery of claim 1 wherein:
each upper rib extends from an inner surface of the well to the pipe.

7. A battery comprising:
a battery housing containing a plurality of cell cavities, the cell cavities suitable for holding a battery cell, each cavity containing a planar segment to facilitate alignment with an upstanding terminal tab of each battery cell;
a battery housing cover having an upper planar member and a plurality of vents, each vent is partially defined by a well interconecting the upper planar member and a well bottom, each well dimensioned such that when the battery housing cover is sealed to the battery housing each terminal tab is positioned between one of the wells and one of the planar segments, the vent further including pipe extending through well bottom, the pipe defining a venting passage, a bottom portion of the pipe including a vent opening and a baffle positioned to partially interrupt fluid flow through the vent opening, the vent being dimensioned such that when the battery housing cover is sealed to the battery housing the well bottom of the vent is positioned below an uppermost edge of an upper end of each cell cavity.

8. The battery of claim 7 further comprising:
a plurality of valve caps, each valve cap being disposed over the top of the pipe of one the vents, each valve cap being made of a flexible material and being sized to hermetically seal the venting passage of its associated pipe up to a venting pressure within the cavity below the pipe, each valve cap expanding at the venting pressure to allow gases from within the cavity below the pipe to vent and contracting when below the venting pressure to reseal the venting passage of the pipe.

9. The battery of claim 7 further comprising:

a plurality of well lids, each well lid being secured to the top of one of the wells, each well lid including at least one opening for the escape of gases.

10. The battery of claim 7 wherein:

each well is dimensioned such that when the battery housing cover is sealed to the battery housing, the well bottom of each vent is positioned adjacent the top of the battery cell in the cell the cell cavity below each vent in order to minimize free space in which gas can accumulate without venting.

11. The battery of claim 10 wherein:

the well of each vent is substantially centered within the upper end of the cavity below each vent.

12. The battery of claim 7 wherein:

the battery cell is a thin metal film cell.

13. The battery of claim 7 wherein:

the well bottom of each vent includes at least one lower rib protruding from a lower surface of the well bottom of the vent, and at least one upper rib protruding from a top surface of the well bottom of the vent.

14. The battery of claim 13 wherein:

each upper rib extends from an inner surface of the well to the pipe.

* * * * *

UNITED STATES PATENT AND TRADEMARK OFFICE
CERTIFICATE OF CORRECTION

PATENT NO.    : 6,255,014 B1
DATED         : July 3, 20001
INVENTOR(S)   : Thomas J. Dougherty, Michael G. Andrew and James A. Lenz It is certified that error appears in the above-identified patent and that said Letters Patent is hereby corrected as shown below:

Column 6,
Line 36, insert -- of -- after "battery"
Line 39, delete "a" after "the".
Line 50, delete "interconecting" and insert therefor -- interconnecting --.
Line 51, add -- being -- before "dimensioned".
Line 55, add -- a -- before "pipe extending".
Line 55, add -- the -- before "well".

Column 7,
Line 15, delete "the cell" before "cavity".

Signed and Sealed this

Third Day of December, 2002

JAMES E. ROGAN
*Director of the United States Patent and Trademark Office*